United States Patent

Funaki et al.

[11] Patent Number: 5,837,384
[45] Date of Patent: Nov. 17, 1998

[54] POLYSTYRENIC STRETCHED FILM AND PROCESS FOR PRODUCING THE POLYSTYRENIC STRETCHED FILM

[75] Inventors: Keisuke Funaki; Takaaki Uchida, both of Ichihara, Japan

[73] Assignee: Idemitsu Petrochemical Co., Ltd., Tokyo, Japan

[21] Appl. No.: 669,387
[22] PCT Filed: Nov. 29, 1995
[86] PCT No.: PCT/JP95/02430
§ 371 Date: Jul. 16, 1996
§ 102(e) Date: Jul. 16, 1996
[87] PCT Pub. No.: WO96/17005
PCT Pub. Date: Jun. 6, 1996

[30] Foreign Application Priority Data

Dec. 2, 1994 [JP] Japan .................................. 6-299254

[51] Int. Cl.[6] ............................ B29C 55/12; B29C 71/02; B29L 7/00; B29K 25/00
[52] U.S. Cl. ................. 428/521; 264/177.1; 264/177.17; 264/177.19; 428/500; 428/523; 428/910
[58] Field of Search .............................. 264/176.1, 177.1, 264/177.17, 177.19; 428/500, 521, 523, 910

[56] References Cited

U.S. PATENT DOCUMENTS 5,286,762  2/1994  Funaki et al. .............................. 522/3
5,373,031  12/1994 Funaki et al. .............................. 522/3
5,518,817  5/1996  Yamasaki et al. ..................... 428/411.1

FOREIGN PATENT DOCUMENTS 3-70746 A    3/1991   Japan .
6-29146 A    2/1994   Japan .

Primary Examiner—D. S. Nakarani
Attorney, Agent, or Firm—Oblon, Spivak, McClelland, Maier & Neustadt, P.C.

[57] ABSTRACT

There are disclosed a polystyrenic stretched film which comprises a styrenic resin composition containing 70 to 100% by weight of a styrenic polymer having a high degree of the syndiotactic configuration, has a crystallinity of 35% or more, and contains 200 ppm or less of residual monomer components and 1000 or less of particles of foreign substances having a size of 9 μm or larger in 1 cm$^3$, and a process for producing the polystyrenic stretched film which comprises extruding the styrenic resin composition in a specific amount in combination with melt filtration of the composition, cooling the extruded composition, biaxially stretching the cooled composition, and heat treating the stretched composition under the condition that the degree of heat treatment is $10^{-1}$ or more and less than $5 \times 10^2$.

According to the present invention, a stretched film having excellent printing property and other properties, such as a high peeling strength after vapor deposition, and a process for efficiently producing the polystyrenic stretched film having the excellent properties are provided.

4 Claims, 1 Drawing Sheet

POLYSTYRENIC STRETCHED FILM AND PROCESS FOR PRODUCING THE POLYSTYRENIC STRETCHED FILM

TECHNICAL FIELD

The present invention relates to a polystyrenic stretched film and a process for producing said film. More particularly, the present invention relates to a polystyrenic stretched film which is advantageously used as a base material for condenser films, FPC electric insulation films, photographic films, process films for printing, films for over-head projectors, packaging films, and the like, and a process for producing said film.

BACKGROUND ART

Styrenic polymers having the syndiotactic configuration have excellent mechanical properties, heat resistance, appearance, solvent resistance, and electric properties, and are expected to be used in various applications. Therefore, various technologies for extrusion of films, sheets, and fibers, various molded articles, and various applications have been proposed.

In the field of films, a material is frequently used for practical applications in the form of laminates, as a film treated with vapor deposition, or as a film having printing thereon. Therefore, it is necessary that a material has excellent properties for printing or vapor deposition. Stretched films having various physical properties which use the styrenic polymers having the syndiotactic configuration described above as a material, processes for producing stretched films, and various applications using the stretched films have been disclosed in Japanese Patent Application Laid-Open No. 182348/1989, Japanese Patent Application Laid-Open No. 182346/1989, Japanese Patent Application Laid-Open No. 67328/1990, Japanese Patent Application Laid-Open No. 143851/1990, Japanese Patent Application Laid-Open No. 74437/1991, Japanese Patent Application Laid-Open No. 86707/1991, Japanese Patent Application Laid-Open No. 124750/1991, Japanese Patent Application Laid-Open No. 131843/1991, Japanese Patent Application Laid-Open No. 261485/1992, Japanese Patent Application Laid-Open No. 200858/1993, Japanese Patent Application Laid-Open No. 57013/1994, Japanese Patent Application Laid-Open No. 57014/1994, Japanese Patent Application Laid-Open No. 57015/1994, Japanese Patent Application Laid-Open No. 57016/1994, Japanese Patent Application Laid-Open No. 57017/1994, Japanese Patent Application Laid-Open No. 64036/1994, Japanese Patent Application Laid-Open No. 64037/1994, Japanese Patent Application Laid-Open No. 65399/1994, Japanese Patent Application Laid-Open No. 65400/1994, Japanese Patent Application Laid-Open No. 65401/1994, Japanese Patent Application Laid-Open No. 65402/1994, Japanese Patent Application Laid-Open No. 80793/1994, Japanese Patent Application Laid-Open No. 91748/1994, Japanese Patent Application Laid-Open No. 91749/1994, Japanese Patent Application Laid-Open No. 91750/1994, Japanese Patent Application Laid-Open No. 99485/1994, Japanese Patent Application Laid-Open No. 100711/1994, Japanese Patent Application Laid-Open No. 106616/1994, Japanese Patent Application Laid-Open No. 107812/1994, Japanese Patent Application Laid-Open No. 107813/1994, Japanese Patent Application Laid-Open No. 114924/1994, and Japanese Patent Application Laid-Open No. 114925/1994.

However, films of conventional styrenic polymers having the syndiotactic configuration are not satisfactory with respect to the printing property including the setting property in the printing operation (adhesion of ink and the like) and other properties, such as peeling strength after vapor deposition. This causes problems when the films are used in various applications.

DISCLOSURE OF THE INVENTION

As the result of intensive studies made by the present inventors to solve the above problems, it has been found that a film having excellent properties, such as an excellent printing property and high peeling strength after vapor deposition, can be obtained when the content of residual monomers which are volatile components in the film and the content of foreign substances are decreased to or below specific values, and crystallinity is increased to or above a specific value. It has also been found by the present inventors that, even when the retention time is increased and the content of residual monomers are increased by using a melt filter to decrease the content of foreign substances, it is possible to decrease the content of residual monomers by a specific heat treatment.

The present invention was completed on the basis of the discoveries described above with the object of providing a film having excellent printing property and other properties, such as a high peeling strength after vapor deposition.

Accordingly, the present invention provides a polystyrenic stretched film which comprises a styrenic resin composition containing 70 to 100% by weight of a styrenic polymer having a high degree of the syndiotactic configuration, has a crystallinity of 35% or more, preferably 37% or more, and contains 200 ppm or less, preferably 150 ppm or less, of residual monomers, and 1000 or less particles, preferably 800 or less particles, of foreign substances having a size of 9 $\mu$m or larger in 1 cm$^3$.

The present invention also provides a process for producing a polystyrenic stretched film which comprises extruding a styrenic resin composition containing 70 to 100% by weight of a styrenic polymer having a high degree of the syndiotactic configuration at 330° C. or lower in 60 minutes or less in combination with melt filtration of the styrenic resin composition, cooling the extruded styrenic resin composition, biaxially stretching the cooled styrenic resin composition, and heat treating the biaxially stretched styrenic resin composition under the condition that the degree of heat treatment A expressed by the following equation (I) is 1×10$^{-1}$ or more and less than 5×10$^2$, preferably 5×10$^{-1}$ or more and 3×10$^2$ or less:

$$A = \Sigma[T \times t / d^2] \qquad (I)$$

wherein T represents temperature of the heat treatment (K), t represents time of the heat treatment (second), and d represents thickness of the film (pm).

In the present invention, it is particularly preferred that the styrenic polymer contains 80 to 100% by mol of the repeating unit of styrene and 0 to 20% by mol of the repeating unit of p-methylstyrene.

BRIEF DESCRIPTION OF THE DRAWINGS

In FIG. 1, 1 indicates an inlet of an ionized air, 2 indicates a stroboscope, 3 indicates a CCD camera, 11 indicates a part for feeding a film, 12 indicates a part for winding a film, 13 indicates an apparatus for image processing, and 14 indicates an apparatus for controlling light emission.

THE MOST PREFERRED EMBODIMENT TO CARRY OUT THE INVENTION

Figure 1:
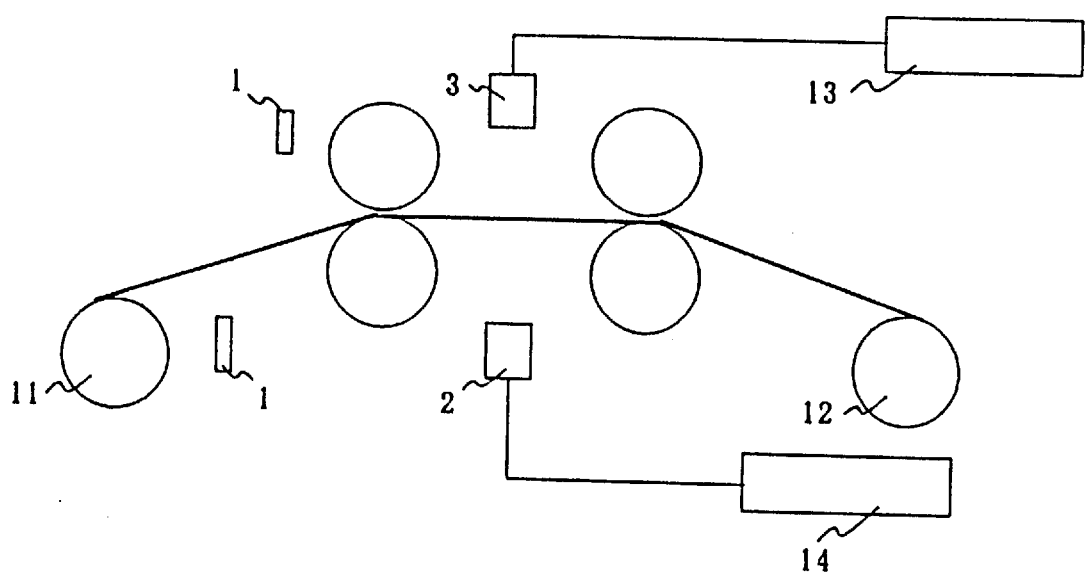
FIG. 1 illustrates a schematic diagram showing the outline of the apparatus for evaluation of the number of foreign substances used in Examples 1 to 4 and Comparative Examples 1 to 3.

The material used for the polystyrenic stretched film is described in the following.

In the present invention, the styrenic polymer which has a high degree of the syndiotactic configuration means that its stereochemical structure is of high degree of the syndiotactic configuration, i.e., the stereo-structures in which phenyl groups or substituted phenyl groups as side chains are located alternately at opposite directions relative to the main chain consisting of carbon-carbon bonds. The tacticity thereof is quantitatively determined by the nuclear magnetic resonance method ($^{13}$C-NMR method) using a carbon isotope. The tacticity as determined by the $^{13}$C-NMR method can be indicated in terms of proportions of structural units continuously connected to each other, i.e., a diad in which two structural units are connected to each other, a triad in which three structural units are connected to each other, and a pentad in which five structural units are connected to each other. The styrenic polymer having a high degree of the syndiotactic configuration used in the present invention means polystyrene, a poly(alkylstyrene), a poly(halogenated styrene), a poly(alkoxystyrene), a poly(vinylbenzoic acid ester), a hydrogenation product of a polymer described above, a mixture of polymers described above, or a copolymer containing the units of the above polymers as main components, having such a syndiotacticity that the proportion of racemic diad is at least 75%, preferably at least 85%, or the proportion of racemic pentad is at least 30%, preferably at least 50%. Examples of the poly(alkylstyrene) include poly(methylstyrene), poly(ethylstyrene), poly(propylstyrene), poly(butylstyrene), poly(phenylstyrene), poly(vinylnaphthalene), poly(vinylstyrene), poly(acenaphthylene), and the like. Examples of the poly(halogenated styrene) include poly(chlorostyrene), poly(bromostyrene), poly(fluorostyrene), and the like. Examples of the poly(alkoxystyrene) include poly(methoxystyrene), poly(ethoxystyrene), and the like. Particularly preferred styrenic polymers among the polymers described above are copolymers of styrene and p-methylstyrene, polystyrene, poly(p-methylstyrene), poly(m-methylstyrene), poly(p-tertiary-butylstyrene), poly(p-chlorostyrene), poly(m-chlorostyrene), and poly(p-fluorostyrene) (refer to Japanese Patent Application Laid-Open No. 187708/1987).

Examples of the comonomer used for the copolymer containing the units of the styrenic polymers as main components thereof include monomers for the styrenic polymers described above; olefin monomers, such as ethylene, propylene, butene, hexene, octene, and the like; diene monomers, such as butadiene, isoprene, and the like; cyclic diene monomers; and polar vinyl monomers, such as methyl methacrylate, maleic anhydride, acrylonitrile, and the like.

Styrenic polymers containing 80 to 100% by mol of the repeating unit of styrene and 0 to 20% by mol of the repeating unit of p-methylstyrene are particularly preferably used.

The molecular weight of the styrenic polymer is not particularly limited. The styrenic polymer having a weight-average molecular weight of 10,000 or more and 3,000,000 or less, more preferably 50,000 or more and 1,500,000 or less, is preferably used. When the weight-average molecular weight is less than 10,000, sufficient stretching cannot be achieved sometimes. The molecular weight distribution of the styrenic polymer is not particularly limited, and polymers having various molecular weight distribution can be used. It is preferred that the ratio of the weight-average molecular weight (Mw) to the number-average molecular weight (Mn) is 1.5 or more and 8 or less. The styrenic polymer having the syndiotactic configuration has the heat resistance remarkably superior to that of styrenic polymers having the conventional atactic configuration.

The styrenic polymer having a high degree of the syndiotactic configuration described above is contained in the polystyrenic stretched film of the present invention in an amount of 70 to 100% by weight, preferably 80 to 100% by weight.

To the styrenic polymer having a high degree of the syndiotactic configuration of the present invention, lubricants, other thermoplastic resins, antioxidants, inorganic fillers, rubbers, compatibilizing agents, colorants, crosslinking agents, crosslinking aids, nucleating agents, plasticizers, and the like, may be added to form a composition to the extent that the object of the present invention is not impaired thereby.

As the lubricant, for example, inorganic particles can be used. The inorganic particles include oxides, hydroxides, sulfides, nitrides, halides, carbonates, sulfates, acetates, phosphates, phosphites, salts of organic acids, silicates, titanates, and borates of elements of IA, IIA, IVA, VIA, VIIA, VIII, IB, IIB, IIIB, and IVB Groups, hydrates of these compounds, complex compounds based on these compounds, and natural mineral particles.

Specific examples of the inorganic particles include compounds of elements of IA Group, such as lithium fluoride, borax (a hydrate of sodium borate), and the like; compounds of elements of IIA Groups, such as magnesium carbonate, magnesium phosphate, magnesium oxide (magnesia), magnesium chloride, magnesium acetate, magnesium fluoride, magnesium titanate, magnesium silicate, a hydrate of magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate, barium phosphite, and the like; compounds of elements of IVA Group, such as titanium dioxide (titania), titanium monooxide, titanium nitride, zirconium dioxide (zirconia), zirconium monooxide, and the like; compounds of elements of VIA Group, such as molybdenum dioxide, molybdenum trioxide, molybdenum sulfide, and the like; compounds of elements of VIIA Group, such as manganese chloride, manganese acetate, and the like; compounds of elements of VIII Group, such as cobalt chloride, cobalt acetate, and the like; compounds of elements of IB Group, such as copper (I) iodide, and the like; compounds of elements of IIB Group, such as zinc oxide, zinc acetate, and the like; compounds of elements of IIIB Group, such as aluminum oxide (alumina), aluminum hydroxide, aluminum fluoride, aluminosilicates (aluminum silicate, kaolin, and kaolinite), and the like; compounds of elements of IVB Group, such as silicon oxides (silica, silica gel), graphite, carbon, glass, and the like; and particles of natural minerals, such as carnallite, kernite, mica (phlogopite), pyrolusite, and the like.

The average diameter of the inorganic particles is not particularly limited, and is preferably 0.01 to 3 μm. The inorganic particles are contained in the molded product in an amount of 0.001 to 5% by weight, preferably 0.005 to 3% by weight. The inorganic particles are contained in the finished molded product, and the method of incorporating the inorganic particles into the molded product is not particularly limited. For example, a method in which the inorganic particles are added or formed by precipitation at a desired step during polymerization, or a method in which the inorganic particles are added at a desired step during melt extrusion, may be used.

As the other thermoplastic resins which may be added to the styrenic resin described above in the present invention, various types of thermoplastic resin may be used. Examples of the thermoplastic resin include styrenic resins having the atactic configuration, styrenic resins having the isotactic configuration, polyphenylene ethers, and the like. These resins described above are easily compatible with the styrenic polymer having the syndiotactic configuration described above, and is effective for controlling crystallization in the preparation of a preliminary molded product for stretching. Therefore, the stretching property can be improved, and the conditions of the stretching can be easily controlled. Thus, a film having excellent mechanical properties can be obtained. When a styrenic resin having the atactic configuration and/or the isotactic configuration are added to the styrenic polymer having a high degree of the syndiotactic configuration, it is preferred that the added resins comprise monomer units similar to those of the styrenic polymer having a high degree of the syndiotactic configuration. The content of the compatible resin component in the styrenic resin composition is 1 to 70% by weight, preferably 2 to 50% by weight. The content of the compatible resin component more than 70% by weight is not preferable because the advantageous properties of the styrenic polymer having the syndiotactic configuration, such as heat stability, are impaired.

As other types of resins which can be added to the styrenic resin used in the present invention and are not compatible with the styrenic resin, any types of resin other than the compatible resins described above, such as polyolefins like polyethylene, polypropylene, polybutene, polypentene, and the like, polyesters like polyethylene terephthalate, polybutylene terephthalate, polyethylene naphthalate, and the like, polyamides like nylon-6, nylon-6,6, and the like, polythioethers like polyphenylene sulfide and the like, polycarbonates, polyarylates, polysulfones, polyether ether ketones, polyether sulfones, polyimides, polymers of halogenated vinyl compounds like teflon and the like, acrylic polymers like polymethyl methacrylate and the like, polyvinylalcohol, and the like other resins, crosslinked resins containing the compatible resins described above, can be used. Because these resins are not compatible with the styrenic polymer having the syndiotactic configuration used in the present invention, these resins can be dispersed in the styrenic resin having the syndiotactic configuration in the form of islands when these resins are added in small amounts. Therefore, these resins are effective for providing good gloss after stretching and for improving lubricating property of the surface. The content of the incompatible resin component is preferably 2 to 50% by weight when the incompatible resin component is added in order to improve gloss, and 0.001 to 5% by weight when the incompatible resin component is added in order to control the surface properties. When the product is used at high temperatures, it is preferred that a relatively heat resistant incompatible resin is used.

As the antioxidant, an antioxidant containing phosphorus, a phenolic antioxidant, or an antioxidant containing sulfur can be used. Polystyrenic resin compositions having good heat stability can be obtained by using such antioxidants.

As the antioxidant containing phosphorus, various types of antioxidant including monophosphites and diphosphites can be used. Examples of the monophosphite include tris (2,4-di-t-butylphenyl) phosphite, tris(mono- and di-nonylphenyl) phosphites, and the like. As the diphosphite, phosphites represented by the general formula:

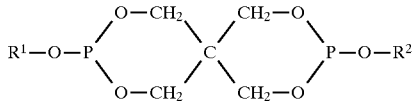

wherein $R^1$ and $R^2$ each represent an alkyl group having 1 to 20 carbon atoms, a cycloalkyl group having 3 to 20 carbon atoms, or an aryl group having 6 to 20 carbon atoms, and may the same or different, can be used. Specific examples of the diphosphite include distearylpentaerythritol diphosphite, dioctylpentaerythritol diphosphite, diphenylpentaerythritol diphosphite, bis(2,4-di-t-butylphenyl)pentaerythritol diphosphite, bis(2,6-di-t-butyl-4-methylphenyl) pentaerythritol diphosphite, diclyohexylpentaerythritol diphosphite, tris(2,4-di-t-butylphenyl) phosphite, tetrakis(2, 4-di-t-butylphenyl)-4,4'-biphenylene phosphonite, and the like. Among these compounds, bis(2,4-di-t-butylphenyl) pentaerythritol diphosphite, bis(2,6-di-t-butyl-4-methylphenyl)pentaerythritol diphosphite, tris(2,4-di-t-butylphenyl) phosphite, and tetrakis(2,4-di-t-butylphenyl)-4,4'-biphenylene phosphonite are preferably used.

As the phenolic antioxidant, various types of phenolic antioxidant can be used. Specific examples of the phenolic antioxidant include dialkylphenols, trialkylphenols, diphenylmonoalkoxyphenols, tetraalkylphenols, and the like.

Examples of the dialkylphenol include 2,2'-methylenebis (6-t-butyl-4-methylphenol), 1,1-bis(5-t-butyl-4-hydroxy-2-methylphenyl)butane, 2,2'-methylene-bis(4-methyl-6-cyclohexylphenol), 4,4'-thio-bis(6-t-butyl-3-methylphenol), 2,2'-bis(5-t-butyl-4-hydroxy-2-methylphenyl)-4-n-dodecylmercaptobutane, and the like. Examples of the trialkylphenol include 2,6-di-t-butyl-4-methylphenol, 2,2'-methylene-bis(6-t-butyl-4-ethylphenol), 2,2'-methylenebis [4-methyl-6-(α-methylcyclohexyl)phenol], 2,2'-methylenebis(4-methyl-6-nonylphenol), 1,1,3-tris(5-t-butyl-4-hydroxy-2-methylphenyl)butane, ethylene glycol-bis[3,3-bis(3-t-butyl-4-hydroxyphenyl)butyrate], 1,1-bis(3,5-dimethyl-2-hydroxyphenyl)-3-(n-dodecylthio)butane, 1,3,5-tris(3,5-di-t-butyl-4-hydroxybenzyl)-2,4,6-trimethyl benzene, 2,2-bis(3,5-di-t-butyl-4-hydroxybenzyl)malonic acid dioctadecyl ester, n-octadecyl-3-(4-hydroxy-3,5-di-t-butylphenyl) propionate, tetrakis[methylene(3,5-di-t-butyl-4-hydroxyhydrocinnamate)]methane, 3,9-bis[1,1-dimethyl-2-(β-(3-t-butyl-4-hydroxy-5-methylphenyl)propionyloxy) ethyl 2,4,8,10-tetraoxaspiro[5,5]undecane, tris(3,5-di-t-butyl-4-hydroxybenzyl) isocyanurate, and the like. Examples of the diphenylmonoalkoxyphenol include 2,6-diphenyl-4-methoxyphenol and the like. Examples of the tetraalkylphenol include tris(4-t-butyl-2,6-dimethyl-3-hydroxybenzyl) isocyanurate and the like.

As the antioxidant containing sulfur, thioether antioxidants are preferable. Specific examples of the thioether antioxidant include dilauryl-3,3'-thiodipropionate, dimyristyl-3,3'-thiodipropionate, distearyl-3,3'-thiodipropionate, pentaerythritol-tetrakis(β-lauryl thiopropionate), bis[2-methyl-4-(3-n-alkylthiopropionyloxy)-5-t-butylphenyl] sulfides, 2-mercaptobenzimidazol, and the like. Among these compounds, pentaerythritol-tetrakis(β-lauryl thiopropionate) is particularly preferable.

In the polystyrenic stretched film of the present invention, an organic compound having an —NH— group and a molecular weight lower than 10,000 may be contained when necessary. As the organic compound, a compound having an electron-attracting group adjacent to the—NH— group is preferable. As the electron-attracting group, a group having an aromatic ring, such as a benzene ring, a naphthalene ring, an anthracene ring, a pyridine ring, a triazine ring, an indenyl ring, or a derivative of these rings, or a group having a carbonyl group is preferable. As the organic compound described above, an organic compound having a heat decomposition temperature of 260° C. or higher is preferable. Specific examples of the organic compound include 2,4-bis-(n-octylthio)-6-(4-hydroxy-3,5-di-t-butylanilino)-1, 3,5-triazine, N,N'-hexamethylene-bis(3,5-di-t-butyl-4-hydroxyhydrocinnamide), N,N'-bis[3-(3,5-di-t-butylhydroxyphenyl)propionyl]hydrazine, 3-(N-salicyloyl) amino-1,2,4-triazole, decamethylenedicarboxylic acid disalicyloyl hydrazide, isophthalic acid (2-phenoxypropionyl hydrazide), 2,2-oxamido-bis[ethyl-3-(3,5-di-t-butyl-4-hydroxyphenyl) propionate], oxalyl-bis (benzylidene hydrazide), N-formyl-N'-salicyloylhydrazine, 2-mercaptobenzimidazole, N,N'-di-2-naphthyl-p-phenylenediamine, 4,4'-bis($\alpha,\alpha$-dimethylbenzyl) diphenylamine, 2-mercaptomethylbenzimidazole, diphenylamine, diphenylamine modified with styrene, diphenylamine modified with octyl group, N-phenyl-1-naphthylamine, poly(2,2,4-trimethyl-1,2-dihydroquinoline), 6-ethoxy-1,2-dihydro-2,2, 4-trimethylquinoline, N,N'-diphenyl-p-phenylenediamine, N-phenyl-N'-(1,3-dimethylbutyl)-p-phenylenediamine, N-phenyl-N'-(3-methacryloxy-2-hydroxylpropyl)-p-phenylenediamine, thiodiphenylamine, paminodiphenylamine, N-salicyloyl-N'-aldehyde hydrazine, N-salicyloyl-N'-acetylhydrazine, N,N'-diphenyloxamide, N,N'-di(2-hydroxyphenyl)oxamide, 6-ethoxy-2,2,4-trimethyl-1,2-dihydroquinoline, N-phenyl-N'-isopropyl-p-phenylenediamine, and the like.

The compound having an —NH— group and a molecular weight lower than 10,000 described above is contained in the polystyrenic stretched film of the present invention in an amount less than 30% by weight when necessary.

The physical properties of the polystyrenic stretched film of the present invention are described in the following.

The polystyrenic stretched film of the present invention has a crystallinity (Xc) of 35% or more, preferably 37% or more. A crystallinity less than 35% is not preferable because the degree of heat shrinkage is increased to cause a larger deformation by heating. The content of residual monomers in the polystyrenic stretched film of the present invention is 200 ppm or less, preferably 150 ppm or less. A content of residual monomers more than 200 ppm is not preferable because the printing property deteriorates and the peeling strength after vapor deposition decreases. The number of particles of foreign substances having a size of 9 $\mu$m or larger in the polystyrenic stretched film of the present invention is 1000 or less in 1 cm$^3$, preferably 800 or less in 1 cm$^3$. When the number of particles of foreign substances having a size of 9 $\mu$m or larger in 1 cm$^3$ is more than 1000, the printing property of the stretched film deteriorates. Therefore, this condition is not preferable.

The properties of the stretched film described above can be evaluated, for example, in accordance with the following methods.

(1) Crystallinity (Xc): Crystallinity (Xc) is measured by using a differential scanning calorimeter or the like apparatus.

Crystallinity (%)={(enthalpy of fusion (J/g)–enthalpy of crystallization by cooling (J/g))/53 (J/g)}×100

As the enthalpy of fusion at the crystallinity of 100%, the value of 53 J/g is used for the styrenic polymer having the syndiotactic configuration.

(2) Content of residual monomers: A piece of film was dipped into dimethylformamide at 100° C. for 3 hours. The content of residual monomers is quantitatively determined by measurement of the obtained extract using the gas chromatography.

(3) Number of foreign substances: Number of foreign substances in a film in an amount corresponding to the volume of 1 cm$^3$ is continuously counted by using a CCD camera or the like. An average value is calculated from the results of 10 measurements.

The polystyrenic stretched film of the present invention described above has excellent printing property and other properties, such as a high peeling strength after vapor deposition. The polystyrenic stretched film of the present invention can be produced by various processes which have conventionally been used. However, in order to efficiently obtain a stretched film having the properties described above, it is preferred that the process for producing a polystyrenic stretched film of the present invention is used.

The process for producing the polystyrenic stretched film of the present invention is described in the following.

In the process for producing the polystyrenic stretched film of the present invention, the styrenic resin composition containing 70 to 100% by weight of a styrenic polymer having a high degree of the syndiotactic configuration is extruded at 330° C. or lower in 60 minutes or less in combination with melt filtration of the styrenic resin composition. The extruded styrenic resin composition is cooled, and the cooled styrenic resin composition is treated with biaxial stretching.

More specifically, the preliminary molded product (a film, a sheet, or a tube) is prepared generally by the extrusion molding using the styrenic polymer having a high degree of the syndiotactic configuration as the material. In the extrusion molding, the melted and kneaded material for molding described above is molded to form a specified shape by using an extruder in combination with melt filtration of the styrenic resin composition. As the extruder, any of a single screw extruder and a twin screw extruder may be used. An extruder having or not having a vent may be used. For the melt filtration of the styrenic resin composition, it is preferred that a filter consisting of sintered metal fiber is used. The pore size of the filter is preferably 5 to 50 $\mu$m. The number of particles of foreign substances can be decreased by the melt filtration. However, a part of the styrenic polymer described above is decomposed by the heat history, and the content of volatile matter (residual monomers) increases. Even though the content of the volatile matter can be decreased by the heat treatment which is subsequently conducted, it is preferred that the temperature of the filtration is kept in the range of 330° C. or lower, more preferably in the range of 250° to 320° C., and the retention time is kept below 60 minutes in order to suppress the increase in the content of volatile matter as much as possible.

The conditions for the extrusion are not particularly limited, and can be suitably determined in accordance with the situation. It is preferred that the temperature is selected in the range which is higher than the melting point or the decomposition temperature of the material for molding by 50° C. or more, and that the shearing force is selected in the range of 5×10$^6$ dyne/cm$^2$ or less. A T-die or a circular die can be used as the die.

In the process for producing the polystyrenic stretched film of the present invention, the obtained preliminary molded product for stretching is solidified by cooling after being molded by the extruder. As the medium for the cooling, various media, such as a gas, a liquid, a metal roll, and the like, can be used. When a metal roll is used, it is effective for decreasing the dispersion of thickness and preventing the formation of waviness that a method using an air knife, an air chamber, a touch roll, an electrostatic pinning, or the like, is adopted.

The temperature of cooling for solidification is generally in the range which is from 0° C. to the temperature higher than the glass transition temperature of the preliminary molded product for stretching by 30° C., preferably in the range which is from the temperature lower than the glass transition temperature of the preliminary molded product for stretching by 70° C. to the glass transition temperature. The rate of cooling can be suitably selected in the range of 200° to 3° C./sec.

The preliminary molded product which has been solidified by cooling is biaxially stretched. In the stretching, the product may be stretched simultaneously in the longitudinal direction and in the transverse direction, or may be stretched consecutively in the two directions in any order. The stretching may be conducted in a single step or in a plurality of steps. The stretching ratio by area is 2 or more, preferably 3 or more.

As the method of stretching, various types of method, such as a method using a tenter, a method of stretching between rolls, a method using bubbling utilizing a gas pressure, a method of rolling, and the like, may be used. A suitable method or a combination of suitable methods can be selected from these methods. The temperature of stretching can be generally selected in the range from the glass transition temperature to the melting point of the preliminary molded product. The rate of stretching is generally $1 \times 10$ to $1 \times 10^5$%/minute, preferably $1 \times 10^3$ to $1 \times 10^5$%/minute.

In the present invention, the styrenic resin composition which has been extruded, cooled, and stretched under the conditions described above is heat treated under the condition that the degree of heat treatment A expressed by the following equation (I) is $1 \times 10^{-1}$ or more and $5 \times 10^2$ or less, preferably $5 \times 10^{-1}$ or more and less than $3 \times 10^2$ or less:

$$A = \Sigma[T \times t/d^2] \quad (I)$$

wherein T represents temperature of the heat treatment (K), t represents time of the heat treatment (second), and d represents thickness of the film ($\mu$m).

The heat treatment can be conducted in accordance with a conventional process. More specifically, the heat treatment can be conducted by holding the extruded, cooled, and stretched styrenic resin composition under a tense condition, a relaxed condition, or a condition of limited shrinkage at a temperature in the range which is from the glass transition temperature to the melting point of the film, preferably from a temperature lower than the melting point by 100° C. to a temperature immediately below the melting point, for 0.5 to 120 seconds. It is possible that the heat treatment is conducted in separate two or more steps under different conditions within the range described above. The heat treatment may also be conducted in an atmosphere of an inert gas, such as argon gas, nitrogen gas, or the like.

According to the process for producing the polystyrenic stretched film of the present invention, the polystyrenic stretched film of the present invention which has been described above can be efficiently produced, and the polystyrenic stretched film having excellent printing property and other properties, such as a high peeling strength after vapor deposition, can be obtained.

The present invention is described in more detail with reference to examples in the following. However, the present invention is not limited by the examples.

Reference Example 1

A glass vessel of a 500 ml inner volume which had been purged with argon was charged with 17 g (71 mmol) of copper sulfate pentahydrate ($CuSO_4.5H_2O$), 200 ml of toluene, and 24 ml (250 mmol) of trimethylaluminum, and the resultant mixture was allowed to react at 40° C. for 8 hours. After the reaction was finished, solid parts were removed from the reaction product, and 6.7 g of a catalyst product was obtained. The catalyst product had the molecular weight of 610 which was measured by the freezing point depression.

Preparation Example 1

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.95 liter of purified styrene, and 0.05 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 446 g of a polymer.

The weight-average molecular weight of the obtained polymer was measured by the gel permeation chromatography using 1,2,4-trichlorobenzene as the solvent at 130° C., and was found to be 305,000. The ratio of the weight-average molecular weight to the number-average molecular weight was 2.67. It was confirmed by the measurement of the $^1$H-NMR that the content of p-methylstyrene in the obtained polymer was 7% by mol. It was also confirmed by the measurements of the melting point and the $^{13}$C-NMR that the obtained polymer was polystyrene having the syndiotactic configuration.

Preparation Example 2

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.97 liter of purified styrene, and 0.03 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 466 g of a polymer.

The weight-average molecular weight of the obtained polymer was measured by the gel permeation chromatography using 1,2,4-trichlorobenzene as the solvent at 130° C., and was found to be 318,000. The ratio of the weight-average molecular weight to the number-average molecular weight was 2.51. It was confirmed by the measurement of the $^1$H-NMR that the content of p-methylstyrene in the obtained polymer was 4% by mol. It was also confirmed by the measurements of the melting point and the $^{13}$C-NMR that the obtained polymer was polystyrene having the syndiotactic configuration.

Preparation Example 3

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.90 liter of purified styrene, and 0.10 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 466 g of a polymer.

The weight-average molecular weight of the obtained polymer was measured by the gel permeation chromatography using 1,2,4-trichlorobenzene as the solvent at 130° C., and was found to be 312,000. The ratio of the weight-average molecular weight to the number-average molecular weight was 2.73. It was confirmed by the measurement of the $^1$H-NMR that the content of p-methylstyrene in the obtained polymer was 12% by mol. It was also confirmed by the measurements of the melting point and the $^{13}$C-NMR that the obtained polymer was polystyrene having the syndiotactic configuration.

EXAMPLE 1

The styrenic polymer having the syndiotactic configuration obtained in Preparation Example 1 was melt extruded at 300° C., and then formed into pellets. The obtained pelletized material was melt extruded by an extruder equipped with a melt filter of a filtration accuracy of 10 $\mu$m (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 1400 $\mu$m. The temperature of melt filtration was 280° C., and the average retention time was 30 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 245° C. for 15 seconds while the width of the sheet is held unchanged, and then heat treated at 245° C. for 15 seconds under the limited shrinkage of 6% to obtain a film having a thickness of 100 $\mu$m. The degree of heat treatment A obtained by the equation (I) was 1.6.

The properties of the obtained film were evaluated in accordance with the following methods.

(1) Crystallinity (Xc): Crystallinity (Xc) was measured by using a differential scanning calorimeter.

$$\text{Crystallinity}(\%) = \{(\text{enthalpy of fusion } (J/g) - \text{enthalpy of crystallization by cooling } (J/g))/53(J/g)\} \times 100$$

(2) Content of residual monomers: The film was cut into a square piece having edges of 3 mm. The obtained piece of the film was extracted with dimethylformamide at 100° C. The content of residual monomers were quantitatively determined by measurement of the obtained extract using the gas chromatography.

(3) Number of foreign substances: The film was fed into a clean room lower than Class 1000 at a speed of 3.0 m/min while an ionized air was blown to the film, and passed between a stroboscope attached with a light diffusion plate and a CCD camera. The number of foreign substances having a size of 9 $\mu$m or larger was counted by an image treatment of the image captured by the CCD camera. The frequency of flashing of the stroboscope was 1200 shots/min. The area of the film corresponding to 1 cm$^3$ of the film was continuously observed in the view area of 2.0×2.5 mm. This measurement was repeated 10 times, and the number of foreign substances in 1 cm$^3$ was obtained as the average of the values from the 10 measurements.

(4) Peeling strength after vapor deposition: The obtained film was coated with aluminum to the thickness of about 80 nm by the vacuum vapor deposition. Lines were cut into the coated surface of the film in the form of a lattice having a distance between lines of 1 mm by using a cutter. A pressure sensitive adhesive tape was attached to the cut surface and then peeled off. The number of lattice elements peeled off from the surface per 100 lattice elements was counted.

(5) Printing property: A stamp of an area of 140 cm$^2$ was used for printing lines of a lattice having a distance between lines of 10 mm. The lines were printed on the film by the stamp using an oil ink. The number of position where the line is discontinuous or diffuse was counted.

The results are shown in Table 1.

FIG. 1 illustrates a schematic diagram showing the outline of the apparatus for evaluation of the number of foreign substances in a clean room lower than Class 1000.

EXAMPLE 2

The styrenic polymer obtained in Preparation Example 2 was melt extruded at 300° C., and then formed into pellets. The obtained pelletized material was melt extruded by an extruder equipped with a melt filter of a filtration accuracy of 10 $\mu$m (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 700 $\mu$m. The temperature of melt filtration was 280° C., and the average retention time was 48 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 255° C. for 15 seconds while the width of the sheet is held unchanged, and then heat treated at 255° C. for 15 seconds under the limited shrinkage of 6% to obtain a film having a thickness of 50 $\mu$m. The degree of heat treatment A obtained by the equation (I) was 6.3.

The properties of the obtained film were measured in accordance with the same methods as those used in Example 1.

EXAMPLE 3

The styrenic polymer obtained in Preparation Example 3 was melt extruded at 300° C., and then formed into pellets. The obtained pelletized material was melt extruded by an extruder equipped with a melt filter of a filtration accuracy of 10 μm (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 2400 μm. The temperature of melt filtration was 290° C., and the average retention time was 17 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 220° C. for 20 seconds while the width of the sheet is held unchanged, and then heat treated at 220° C. for 20 seconds under the limited shrinkage of 6% to obtain a film having a thickness of 175 μm. The degree of heat treatment A obtained by the equation (I) was 0.6.

The properties of the obtained film were measured in accordance with the same methods as those used in Example 1.

EXAMPLE 4

The styrenic polymer obtained in Preparation Example 2 was melt extruded at 300° C., and then formed into pellets. The obtained pelletized material was melt extruded by an extruder equipped with a melt filter of a filtration accuracy of 10 μm (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 140 μm. The temperature of melt filtration was 280° C., and the average retention time was 55 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 255° C. for 15 seconds while the width of the sheet is held unchanged, and then heat treated at 255° C. for 15 seconds under the limited shrinkage of 6% to obtain a film having a thickness of 10 μm. The degree of heat treatment A obtained by the equation (I) was 158.4.

The properties of the obtained film were measured in accordance with the same methods as those used in Example 1.

Comparative Example 1

The styrenic polymer obtained in Preparation Example 1 was melt extruded at 300° C., and then formed into pellets. The obtained pelletized material was melt extruded by an extruder equipped with a melt filter of a filtration accuracy of 10 μm (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 1400 μm. The temperature of melt filtration was 280° C., and the average retention time was 80 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 180° C. for 2 seconds while the width of the sheet is held unchanged to obtain a film having a thickness of 100 μm. The degree of heat treatment A obtained by the equation (I) was 0.09.

The properties of the obtained film were measured in accordance with the same methods as those used in Example 1.

Comparative Example 2

The styrenic polymer obtained in Preparation Example 2 was melt extruded at 300° C., and then formed into pellets. The obtained pelletized material was melt extruded by an extruder equipped with a melt filter of a filtration accuracy of 10 μm (a product of Nippon Seisen Co., Ltd.; a filter of sintered metal fiber; a leaf disk type), and then brought into tight contact with a cooling roll of 50° C. by the electrostatic pinning method to prepare a preliminary molded sheet for stretching having a thickness of 100 μm. The temperature of melt filtration was 280° C., and the average retention time was 90 minutes.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 190° C. for 65 seconds while the width of the sheet is held unchanged, and then heat treated at 190° C. for 55 seconds under the limited shrinkage of 6% to obtain a film having a thickness of 10 μm. The degree of heat treatment A obtained by the equation (I) was 556.

The properties of the obtained film were measured in accordance with the same methods as those used in Example 1.

Comparative Example 3

A film was prepared and evaluated in accordance with the same procedures as those used in Example 1 except that the styrenic polymer was extruded by the extruder not equipped with a melt filter.

The properties of the obtained film were measured in accordance with the same methods as those used in Example 1.

TABLE 1

(Part 1)

| | | | film | | |
|---|---|---|---|---|---|
| | melt filter | degree of heat treatment A | thickness μm | average crystallinity % | content of residual monomers ppm |
| Example 1 | 10 | 1.6 | 100 | 44 | 31 |
| Example 2 | 10 | 6.3 | 50 | 45 | 23 |
| Example 3 | 10 | 0.6 | 175 | 41 | 47 |
| Example 4 | 10 | 153 | 10 | 46 | <20 |
| Comparative Example 1 | 10 | 0.09 | 100 | 33 | 350 |
| Comparative Example 2 | 10 | 556 | 10 | 47 | 220 |
| Comparative Example 3 | none | 1.6 | 100 | 44 | 20 |

TABLE 1

(Part 2)

| | film | | | |
| --- | --- | --- | --- | --- |
| | number of foreign substances/ cm³ | number of peeled element after vapor deposition | printing property | |
| | | | diffuse line | discontinuous line |
| Example 1 | 457 | 0 | none | none |
| Example 2 | 333 | 0 | none | none |
| Example 3 | 519 | 9 | none | none |
| Example 4 | 483 | 0 | none | none |
| Comparative Example 1 | 498 | 7 | 12 | none |
| Comparative Example 2 | 461 | 5 | >8 | none |
| Comparative Example 3 | 6754 | 8 | none | 35 |

INDUSTRIAL APPLICABILITY

As described in the above, the polystyrenic stretched film of the present invention has excellent printing property and other properties, such as a high peeling strength after vapor deposition. According to the process for producing the polystyrenic stretched film of the present invention, the polystyrenic stretched film having the excellent properties can be efficiently produced.

Therefore, the polystyrenic stretched film of the present invention can be advantageously used as a base material for condenser films, electric insulation films, photographic films, process films for printing, optical films such as films for over-head projectors, and packaging films and is remarkably valuable in the industrial applications.

We claim:

1. A polystyrenic stretched film which comprises a styrenic resin composition containing 70 to 100% by weight of a styrenic polymer having a syndiotacticity such that a proportion of racemic pentad is at least 30%, has a crystallinity of 35% or more, and contains 200 ppm or less of residual monomers and 1000 or less particles of foreign substances having a size of 9 $\mu$m or larger and not larger than 10 $\mu$m in 1 cm³.

2. The polystyrenic stretched film according to claim 1 wherein the styrenic polymer contains 80 to 100% by mol of the repeating unit of styrene and 0 to 20% by mol of the repeating unit of p-methylstyrene.

3. A process for producing a polystyrenic stretched film which comprises extruding a styrenic resin composition containing 70 to 100% by weight of a styrenic polymer having a syndiotacticity such that a proportion of racemic pentad is at least 30%, at 330° C. or lower in 60 minutes or less in combination with melt filtration of the styrenic resin composition to reduce to 1000 or less the number of particles of foreign substances having a size of 9 $\mu$m or larger and not larger than 10 $\mu$m in 1 cm³, cooling the extruded styrenic resin composition, biaxially stretching the cooled styrenic resin composition, and heat treating the biaxially stretched styrenic resin composition under the condition that the degree of heat treatment A expressed by the following equation (I) is in the range of 0.1 to 500:

$$A = \Sigma[T \times t / d^2] \quad (I)$$

wherein T represents temperature of the heat treatment (K), t represents time of the heat treatment (second), and d represents thickness of the film ($\mu$m).

4. The process for producing a polystyrenic stretched film according to claim 3 wherein the styrenic polymer contains 80 to 100% by mol of the repeating unit of styrene and 0 to 20% by mol of the repeating unit of p-methylstyrene.

* * * * *